Sept. 6, 1966 E. R. BREAULT 3,270,902
TRASH BIN WITH FORK ARM LATCHING DOGS
Filed July 6, 1965 3 Sheets-Sheet 2
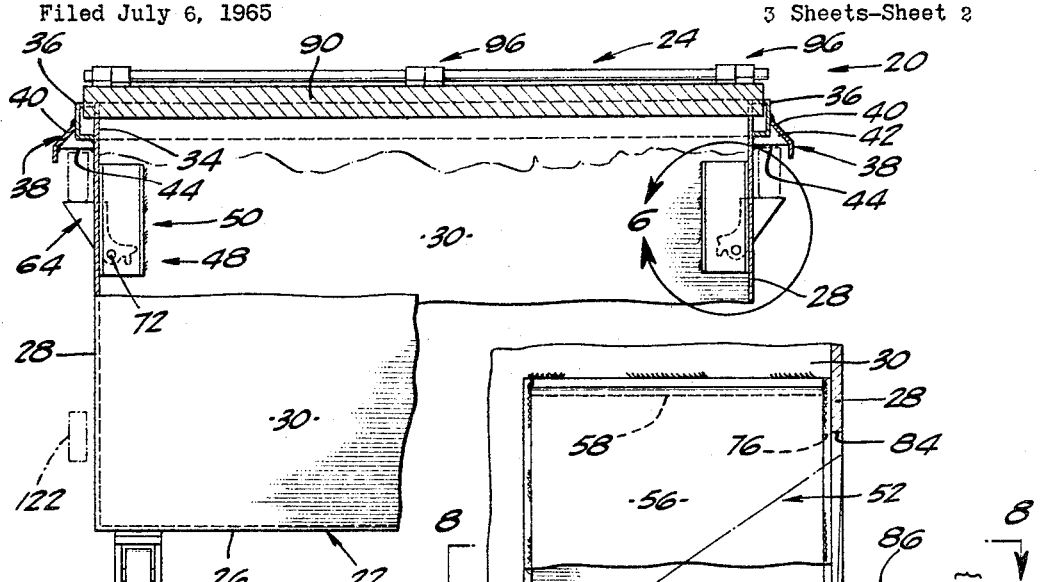
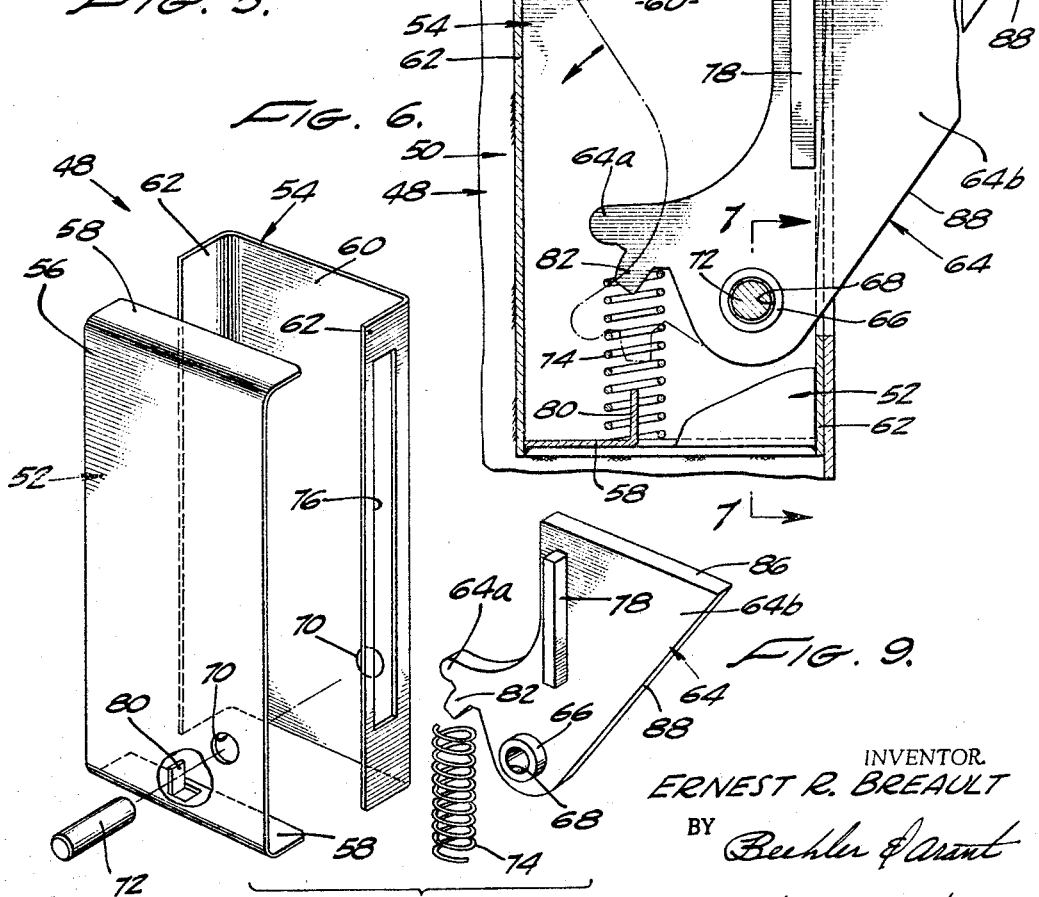
INVENTOR.
ERNEST R. BREAULT
BY
ATTORNEYS

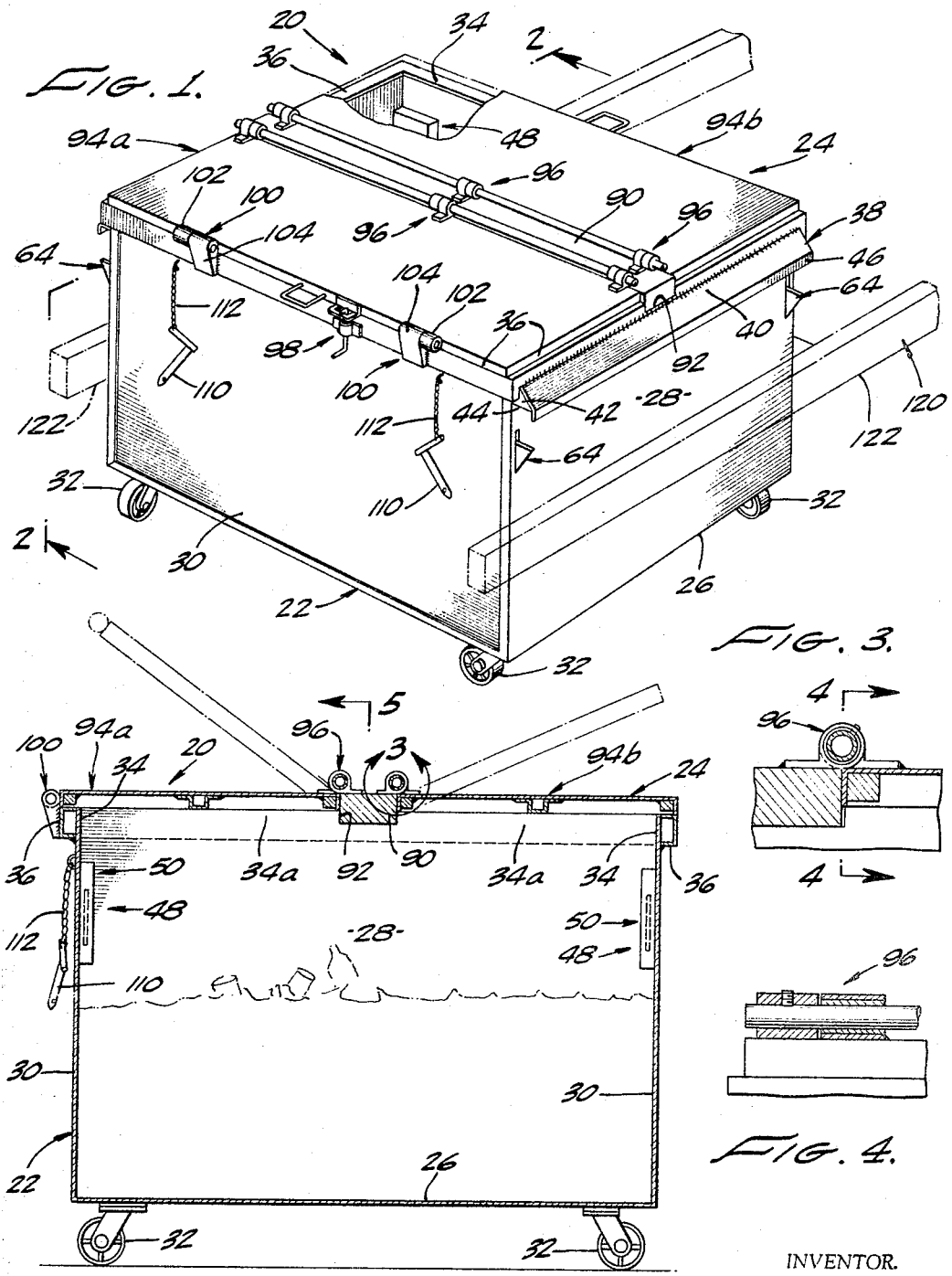

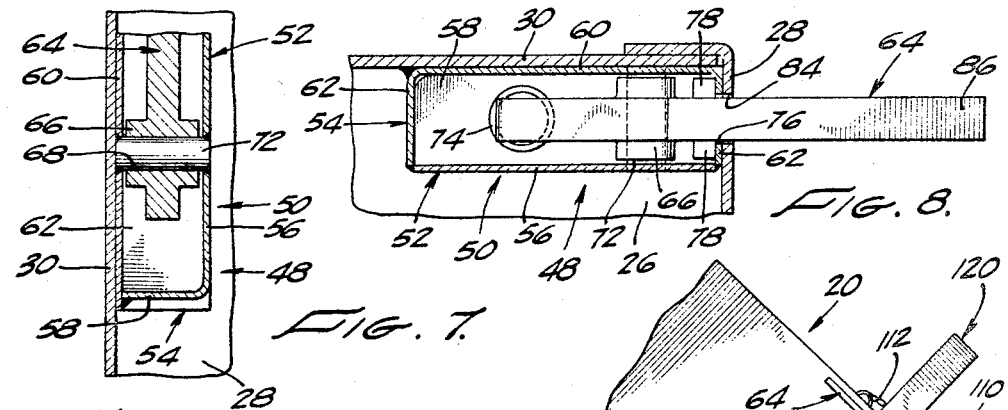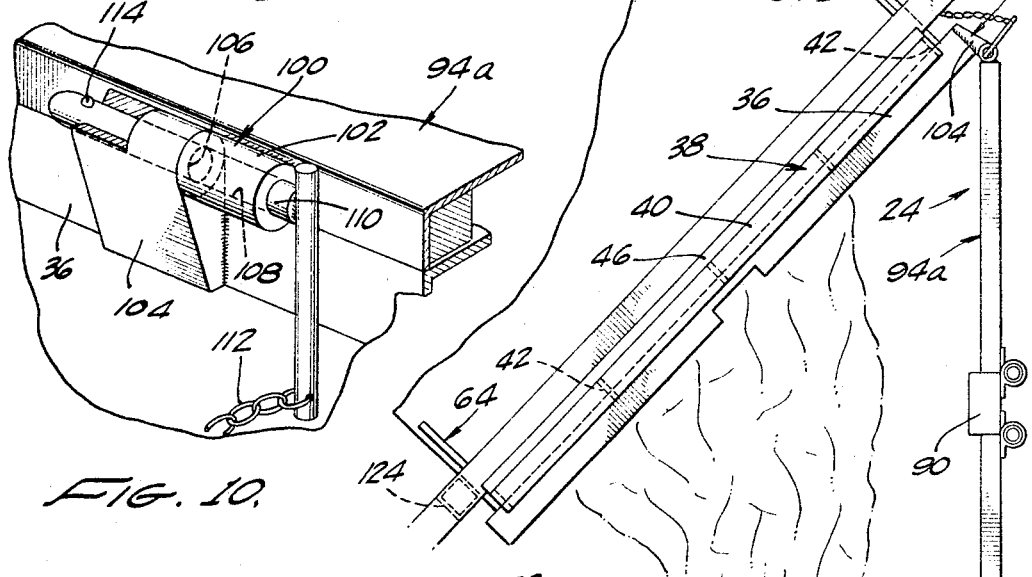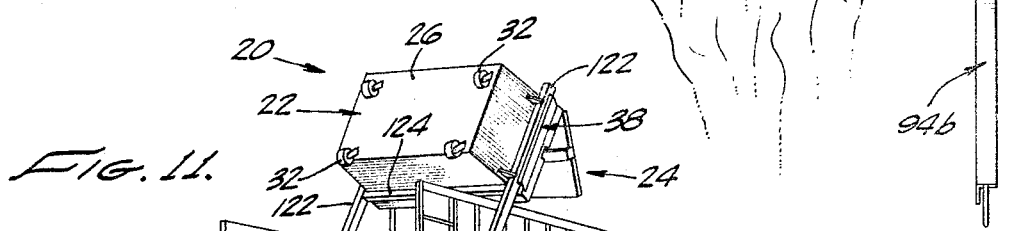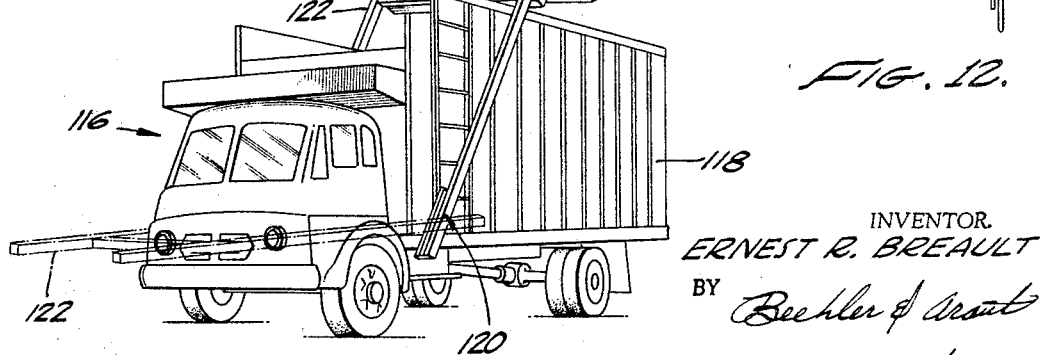

United States Patent Office 3,270,902
Patented Sept. 6, 1966

3,270,902
TRASH BIN WITH FORK ARM LATCHING DOGS
Ernest R. Breault, 26009 E. 6th St., San Bernardino, Calif.
Filed July 6, 1965, Ser. No. 469,817
13 Claims. (Cl. 214—302)

This invention relates generally to trash collection equipment and has more particular reference to an improved trash bin for use with trash bin service vehicles of the type which are equipped with a trash receiver and a fork lift device for elevating the trash bin from its normal upright position of use to an inverted position over the trash receiver, thereby to empty the contents of the bin into the receiver.

The improved trash bin of this invention may be located at a fixed trash collection point or, in the alternative, the bin may be mounted on a transport vehicle for transportation along a trash collection route from one trash collection point to the next. The illustrated trash bin of the invention, for example, is particularly designed for use as a mobile trash receiver to be transported by a trash collection vehicle of the type disclosed in my co-pending application, Serial No. 469,468 filed July 6, 1965, and entitled Trash Pickup Cart.

Briefly, the trash collection vehicle disclosed in my above mentioned co-pending application comprises a chassis with spaced end portions defining therebetween a cargo space, and a single, longitudinal frame member extending over the cargo space between and interconnecting the chassis end portions. This frame member forms the sole connection between the end portions of the chassis and is located mid-way between the sides of the vehicle. Accordingly, the cargo space opens laterally through opposite sides of the vehicle and vertically through the underside of the vehicle. Disposed within this cargo space is a trash bin. The trash bin is equipped with lower ground engaging wheels which permit the bin to be moved along the ground laterally into and from the cargo space. Mounted on the end portions of the vehicle chassis, at opposite ends of the cargo space, are hoist means which may be operated in unison to vertically move the trash bin between a lower position, wherein the trash bin wheels rest on the ground, and a raised position, wherein the trash bin is disposed for transportation by the vehicle. The open top of the trash bin is closed by a pair of covers hinged along one edge to a bar which extends endwise across the open top of the trash bin, midway between the side walls thereof. Each cover, when closed overlies approximately one half of the open top of the trash bin. The covers are moveable to upright open positions wherein the open top of the bin is exposed at each side of the vehicle, thereby permitting trash to be emptied into the bin from either side of the vehicle.

According to the preferred mode of operation of the trash vehicle under discussion, the vehicle travels along its assigned trash route to collect the trash from each collection point there along. When the trash bin is finally filled to capacity, the bin is replaced by an empty bin and the trash collection vehicle continues along the next leg of its route. This process may be repeated several times along a typical trash collection route. Accordingly, after the collection route has been completed, the route is lined with a number of filled trash bins. These trash bins are emptied by a service vehicle which proceeds along the route from one trash bin to the next. The service vehicle is equipped with a large trash receiver and a fork lift device for elevating each trash bin to an inverted position over the receiver, thereby to empty the contents of the bin into the receiver. The empty trash bin is then left at its particular location along the trash collection route in readiness to replace a filled trash bin on the trash collection vehicle when the latter next proceeds along this particular trash collection route.

The trash bin of the present invention is intended primarily as a mobile trash receiver for use with a trash collection vehicle and a trash bin service vehicle of the character described. As will appear from the ensuing description, however, the trash bin of the invention may be used with other types of trash collection vehicles. Alternatively, the trash bin may be employed as a stationary trash receiver to be located at a fixed trash collection point.

One important aspect of the invention is concerned with the unique construction of the present trash bin which facilitates lifting engagement with the bin of the fork arms on the service vehicle. Thus, most existing trash bins which are designed to be emptied by service vehicles of the character described are equipped with closed channels which extend across the underside of the bins to receive the forks of the vehicle fork lift devices. When engaging the fork arms with a trash bin of this type, it is necessary to first maneuver the service vehicle to a position in which the arms are aligned with the trash bin channels and to then drive the vehicle forwardly in such a way as to insert the arms into the channels. This operation is difficult and time consuming and results in a substantial loss of time and money in the average work day of a typical trash bin service vehicle.

The present improved trash bin is uniquely constructed to alleviate this problem of lifting engagement of the fork lift arms on the service vehicle with the bin as well as subsequent disengagement of the arms from the bin. According to the invention, the present trash bin is dimensioned to be straddled in the endwise direction by the fork lift arms of the service vehicle and is equipped at its ends with upper and lower thrust shoulders which are adapted for supporting engagement with the fork arms when the trash bin occupies its normal upright position of rest and its inverted emptying position over the trash receiver of the service vehicle, respectively. The upper thrust shoulders are rigidly joined to the bin. The lower thrust shoulders are movable endwise above the bin between extended and retracted positions. In their extended positions, the lower thrust shoulders are disposed for supporting engagement with the fork arms of the service vehicle. In their retracted positions, the lower thrust shoulders are disposed to clear the fork arms for upward movement of the latter across the ends of the trash bin into vertical supporting engagement with the upper thrust shoulders. According to the preferred practice of the invention, the lower thrust shoulders comprise spring loaded latch dogs which are retracted by a camming action between the dogs and the fork lift arms of the service vehicle. Accordingly, lifting engagement of the fork arms of the service vehicle with the trash bin requires, merely, initial maneuvering of the vehicle to a position in which the arms straddle the trash bin in its endwise direction and subsequent elevation of the arms along the ends of the trash bin, past the lower thrust shoulders, into vertical supporting engagement with the upper thrust shoulders on the bin. During this upward movement of the arms, the lower thrust shoulders are retracted by the arms and then returned, by spring action, to their extended positions below the arms, thereby to condition the trash bin for elevation with the arms to its inverted emptying position over the trash receiver of the vehicle. The fork lift arms on the service vehicle are disengaged from the trash bin by first lowering the bin to its normal upright position of rest on the ground and then backing the vehicle away from the bin.

A second important aspect of the invention is concerned with the cover structure of the trash bin. As noted earlier, the trash bin employed on the trash collection vehicle of my aforementioned co-pending application, Serial No. 469,468 is arranged to permit trash to be emptied into the bin from either side of the vehicle. To this end, the trash bin is equipped with a pair of hinged covers which are swingable to upright open positions, wherein the covers expose a pair of top openings in the bin located at opposite sides of the bin. These openings are sufficiently large to permit trash to be emptied into the bin from either side of the trash collection vehicle. However, it has been determined that such openings are not large enough to enable collected trash to empty freely from the bin when the latter is elevated to its inverted position over the trash receiver of the trash bin service vehicle. Thus, the large mass of collected trash in the bin tends to jam in and thereby block the trash bin openings.

According to the present invention, this problem is avoided by providing a trash bin in which the hinged trash bin covers form part of a separate cover assembly. In normal trash collection service of the trash bin, the cover assembly rests on the upper edge of the lower trash bin container in such a way as to permit the hinged covers of the assembly to be opened and closed in the usual way. Along the outer edge of one hinged cover and the upper edge of the adjacent trash bin side wall are releasable hinge connections which may be engaged to pivotally connect the cover assembly to the lower trash bin container. These hinge connections, when engaged, permit the entire cover assembly to swing open relative to the container, when the trash bin is raised to its inverted position over the trash receiver of the trash bin service vehicle. The entire top opening of the container is thereby exposed to permit the collected trash to freely empty from the bin.

A general object of the present invention, therefore, is to provide an improved trash bin of the character described.

Another object of the invention is to provide an improved trash bin with thrust shoulders which are uniquely constructed and arranged to facilitate lifting engagement with the bin of the fork arms on the fork lift device of a trash bin service vehicle.

Yet another object of the invention is to provide an improved trash bin having a novel cover assembly which provides a pair of hinged covers for the bin in normal trash collection service and which may be hingeably connected to the lower trash bin container in such a way as to permit the entire cover assembly to swing open when the trash bin is inverted for emptying collected trash from the bin.

A further object of the invention is to provide a novel thrust shoulder or latch dog assembly for a trash bin of the character described.

Yet a further object of the invention is to provide a trash bin of the character described which is relatively simple in construction, economical to manufacture, rugged, and otherwise ideally suited to its intended purpose.

Other objects, advantages, and features of the invention will become readily evident as the description proceeds.

With these and other objects in view, the invention consists in the construction, arrangement, and combination of the various parts of the trash bin whereby the objects contemplated are attained, as hereinafter set forth, pointed out in the appended claims and illustrated in the accompanying drawings.

In these drawings:

FIGURE 1 is a perspective view, partially broken away, of an improved trash bin according to the invention;

FIGURE 2 is an enlarged section taken on line 2—2 of FIGURE 1;

FIGURE 3 is an enlargement of the area encircled by the arrow 3 in FIGURE 2;

FIGURE 4 is a section taken on line 4—4 in FIGURE 3;

FIGURE 5 is a section taken on line 5—5 in FIGURE 2;

FIGURE 6 is an enlarged vertical section through the latch dog assembly encircled by the arrow 6 in FIGURE 5;

FIGURE 7 is a section taken on line 7—7 in FIGURE 6;

FIGURE 8 is a section taken on line 8—8 in FIGURE 6;

FIGURE 9 is an exploded perspective view of the latch dog assembly illustrated in FIGURES 6 through 8;

FIGURE 10 is an enlarged perspective view, partially broken away, of one of the releasable hinge connections for the cover assembly of the trash bin;

FIGURE 11 is a perspective view of a service vehicle of the type which is adapted to empty the present trash bin and illustrates the bin elevated to its inverted emptying position over the trash receiver of the vehicle; and FIGURE 12 is an enlarged fragmentary side elevation of the inverted trash bin in FIGURE 11.

The trash bin 20 illustrated in these drawings comprises a lower container 22 and an upright cover assembly 24. The lower trash bin container 22 has a generally rectangular shape and includes a bottom wall 26 bounded by upstanding side and end walls 28 and 30, respectively. Attached to the underside of the bottom wall 26, at the four corners of the container 22, are swivel wheels 32. When the trash bin 20 is used in connection with a trash collection vehicle of the type disclosed in my aforementioned co-pending application Serial No. 469,468, these wheels support the trash bin for movement along the ground laterally into and from the cargo space of the vehicle. Joined to the upper edge portions of the container walls 28 and 30, and encircling the top opening 34 of the trash bin container 22, are reinforcing channels 36.

Extending across the ends of the trash bin container 22, parallel to and adjacent the upper edges of the container end walls 28, are upper horizontal thrust shoulders 38. These upper thrust shoulders comprise downwardly sloping angle plates 40 welded along their upper edges to the adjacent reinforcing channels 36 and gussets 42 below are welded to the angle plates 40, the adjacent reinforcing channels 36, and the container end walls 28. Each upper thrust shoulder has a number of gussets 42. The lower edges 44 of the gussets 42 are disposed in a common plane parallel to the bottom wall 26 of the container 22. These lower edges of the gussets define on the thrust shoulders 38 downwardly presented shoulder surfaces. The angle plates 40 have lower flanges 46 which depend below the shoulder surfaces 44.

Located within each end of the container 22, below the adjacent upper thrust shoulders 38 and against the inner surfaces of the container side walls 30, respectively, are a pair of lower thrust shoulder or latch dog assemblies 48. Each latch dog assembly 48 comprises a flat rectangular housing 50 which is welded or otherwise rigidly joined to the adjacent container side and end walls 28 and 30. The housing 50 of each latch dog assembly is composed of two channel members 52 and 54. Channel member 52 has a rectangular web section 56 with flanges 58 along its end edges. Channel member 54 has a rectangular web section 60 with flanges 62 along its side edges. These channel members are disposed with their flanges in mutually perpendicular planes and extending inwardly into the interfitting relation illustrated to form edge walls on the housing 50. The flanges 58 on the channel member 52 seat against the web 60 of the channel member 54, between the adjacent ends, respectively, of the flanges 62 on the latter channel member, thereby to position the web sections 58, 60 of the channel members in spaced parallel relation. The channel members are tack welded or otherwise joined to form an integral housing structure.

Within the housing 50 of each latch dog assembly 48 is a flat plate-like thrust shoulder or latch dog 64 having the general shape of a bell crank. At the juncture of the latch dog arms 64a, 64b is a laterally projecting bushing formation 66 with a bore 68 disposed on an axis normal to the plane of the dog. Extending through this bushing bore and aligned bores 70 in the web sections 56, 60 of the housing channel members 52, 54 is a pivot pin 72. Pivot pin 72 is welded or otherwise secured to the channel members and supports the latch dog 64 for pivotal movement in the housing 50. Acting between the latch dog arm 64a and the lower housing flange 58 is a compression spring 74 which urges the other latch dog arm 64b outwardly through a slot 76 in one vertical housing flange 62. Projecting laterally from the sides of the latch dog 64 are stop shoulders 78 which engage the slotted housing flange 62 at opposite sides of the slot 76 therein to limit rotation of the dog under the action of the spring 74. Projections 80 and 82 on the lower housing flange 58 and the latch dog arm 64a, respectively engage in opposite ends of the spring 74 to retain the latter in operative position.

The four latch dog assemblies 48 are mounted within the ends of the lower trash bin container 22 in positions wherein the edge wall slots 76 in the assembly housings 50 are aligned with vertical slots 84 in the adjacent container end walls 28. The latch dogs 64 of the assemblies are pivotally moveable in vertical planes extending endwise of the container 22 between outer extended positions wherein the latch dog arm 64b projects beyond the outer surfaces of the adjacent container end walls 28, as illustrated in full line in FIGURE 6, and retracted positions wherein the latch dog arms 64b are generally flush with the end walls, as shown in phantom lines in the latter figure. The latch dog springs 74 yieldably retain the latch dog 64 in their extended positions. The latch dogs 64 have upper, upwardly presented shoulder surfaces 86 which confront and are disposed in a common plane generally parallel to the downwardly presented shoulder surfaces 44 on the upper thrust shoulders 38 when the latch dogs are extended. Each latch dog has a downwardly presented beveled camming surface 88 which inclines upwardly at an acute angle to the adjacent container end wall 28 when the dog is extended.

The trash bin cover assembly 24 comprises a central hinge bar 90 which extends across the top opening 34 of the lower trash bin container 22, midway between the container side wall 30. The ends of this bar seat in notches 92 cut into the upper edges of the container end walls 28 and the adjacent reinforcing channels 36. Hinge bar 90 divides the top opening 34 of the container 22 into two separate trash bin openings 34a through which trash may be emptied into the container during normal trash collection service of the bin 20, as described below. Located at opposite sides of the hinge bar 90 are a pair of trash bin covers 94a and 94b. The inner edges of these covers are pivotally connected to the bar 90 by hinge means 96. Covers 94a and 94b are vertically swingable between closed positions, shown in full lines in FIGURE 2, wherein the covers rest on the upper edges of the container walls 28 and 30, and open positions wherein the covers are disposed in upright confronting relation over the hinge bar 90. In the open positions of the covers 94a, 94b, the trash bin openings 34a are exposed to permit trash to be emptied into the bin 20 from either side thereof. Latches 98 are provided for releasably locking the covers in their closed positions.

Along the outer edge of the cover 94a and the upper edge of the adjacent container side wall 30 are releasable hinge connections 100 which may be selectively engaged and disengaged. When the hinge connections 100 are disengaged, the trash bin covers 94a, 94b may be freely hinged between their open and closed positions. Hinged connections 100 when engaged, pivotally connect the cover assembly 24 to the lower trash bin container 22 for hinging of the entire cover assembly to an open position relative to the container, as shown in FIGURE 12.

Hinge connections 100 comprise a pair of hinge brackets 102 secured to the outer edge of the cover 94a and a pair of hinge brackets 104 secured to the upper edge portion of the adjacent container side wall 30. When the cover 94a is closed, the hinge brackets 102, 104 are disposed in the overlapping positions shown in FIGURES 1 and 10 wherein bores 106 and 108 in the brackets, respectively, are coaxially aligned. The hinge connections 100 are completed by removable hinge pins 110 which are slidably insertable through the aligned bores 106, 108 to pivotally join the cover assembly 24 to the container 22. These hinge pins are preferably attached by chains 112 to the adjacent container side wall 30 and are equipped with spring detents 114 for releasably retaining the pins in their operative positions in the hinge brackets 102, 104.

FIGURE 11 illustrates a trash bin service vehicle 116 of the kind which is adapted to empty the present trash bin 20. Vehicle 116 has a rear trash receiver 118 with an open top, and a fork lift device 120 for vertically moving the trash bin 20 between its normal upright position of rest on the ground and its elevated position of FIGURE 11, wherein the bin is inverted over the trash receiver 118 to empty the collected trash from the bin into the receiver.

Fork lift device 120 comprises a pair of fork arms 122 which are hinged at their inner ends to the vehicle 116 for vertical swinging movement between their lower phantom line positions and their upper full line positions of FIGURE 11. The arms are driven between these positions by power means (not shown) on the service vehicle. Extending between and joining to the fork arms 122, a distance inwardly from their outer ends is a cross bar 124. The outer ends of the fork arms 122 are spaced to straddle the present trash bin 20 in its endwise direction, as shown in FIGURES 1, 5, and 11.

In normal trash collection service of the present trash bin 20, the latter is supported in its normal upright position with the covers 94a and 94b open to permit trash to be emptied into the bin from either side thereof. The trash bin may be either located at a fixed trash collection point or may be transported along a trash collection route from one collection point to another, by a suitable trash collection vehicle, such as that disclosed in my aforementioned co-pending application Serial No. 469,468. Whenever desired, as during transportation of the bin any distance along a public thoroughfare, the trash bin covers 94a, 94b may be closed to cover and conceal the contents of the bin.

When the trash bin 20 is to be emptied, the service vehicle 116 is maneuvered to a position in which the arms 122 of its fork lift device 120 straddle the bin in its endwise direction and the vehicle is located at the side of the vehicle remote from the hinge connections 100. The hinge connections 100 are then engaged by insertion of the hinge pins 110 through the aligned bores 106, 108 in the overlapping hinge brackets 102, 104. Thereafter, the fork lift device 120 on the service vehicle is elevated to raise the fork lift arms 122 into vertical supporting engagement with the upper thrust shoulders 38 on the trash bin. As the elevating lift arms approach the upper thrust shoulders, the arms engage the lower camming surfaces 88 on the currently extended lower thrust shoulders or latch dogs 64 and cam these dogs to their retracted positions. After the fork arms have been elevated sufficiently to clear the latch dogs, the latter are returned to their extended positions below the arms by latch dog springs 74. Continued elevation of the fork lift device 120 on the service vehicle 116 raises the trash bin 20 to its elevated position of FIGURES 11 and 12 wherein the bin is inverted over the trash receiver 118 on the vehicle. In this inverted position of the trash bin, the currently extended latch dogs 64 engage the fork lift arms 122 of the service vehicle to support the trash bin on the arms. The trash bin is restrained against downward movement along the arms by the fork arm cross bar 124.

As the trash bin 20 approaches its inverted position of

FIGURES 11 and 12, the entire cover assembly 24 swings bodily away from the lower trash bin container 22, as shown, to expose the entire top opening 34 of the container. The contents of the trash bin are thus permitted to freely empty from the bin into the receiver 118 on the service vehicle. After the trash bin 20 has been emptied, the fork lift device 120 on the service vehicle is lowered to return the trash bin to its normal upright position on the ground. As the trash bin rotates to its normal upright position, the cover assembly 24 swings back to its normal position on top of the bin. Thereafter, the service vehicle 116 is backed away from the trash bin to disengage the fork lift arms 122 from the bin.

It is apparent, therefore, that the invention herein described and illustrated is fully capable of attaining the several objects and advantages preliminarily set forth. While a presently preferred embodiment of the invention has been selected for illustration and description in the application, it is evident that various modifications in the design, arrangement of parts, and instrumentalities of the invention are possible within the spirit and scope of the following claims.

Having described the invention, what is claimed as new in support of Letters Patent is:

1. A trash bin for use with a service vehicle of the type having a trash receiver and a fork lift device with spaced fork arms for elevating said bin from its normal upright position of use to an inverted position of elevation over said trash receiver to empty trash from said bin into said receiver, said trash bin comprising:

a lower rectangular container adapted to be straddled endwise by said fork arms and including a bottom wall bounded by upstanding side and end walls, upper thrust shoulders at the ends, respectively, of said container having downwardly presented shoulder surfaces disposed for supporting engagement with said fork lift arms when said trash bin occupies its normal upright position, lower thrust shoulders at the ends, respectively, of said container below said upper thrust shoulders and having upwardly presented shoulder surfaces, means supporting said lower thrust shoulders on said container for movement in generally endwise directions of said container between inner retracted positions wherein said lower shoulders are disposed to clear said fork arms for upward and movement of said arms across the ends of said container into supporting engagement with said upper shoulders, and outer extended positions wherein said lower shoulders are disposed for supporting engagement with said fork arms when said bin occupies said inverted position, means for normally retaining said lower thrust shoulders in their extended positions, and means for effecting retraction of said lower thrust shoulders to their retracted positions.

2. A trash bin for use with a service vehicle of the type having a trash receiver and a fork lift device with spaced fork arms for elevating said bin from its normal upright position of use to an inverted position of elevation over said trash receiver to empty trash from said bin into said receiver, said trash bin comprising:

a lower rectangular container adapted to be straddled endwise by said fork arms and including a bottom wall bounded by upstanding side and end walls, upper thrust shoulders, at the ends, respectively, of said container having downwardly presented shoulder surfaces disposed for supporting engagement with said fork lift arms when said trash bin occupies its normal upright position, lower thrust shoulders at the ends, respectively, of said container below said upper thrust shoulders and having upwardly presented shoulder surfaces, means supporting said lower thrust shoulders on said container for movement in generally endwise directions of said container between inner retracted positions wherein said lower shoulders are disposed to clear said fork arms for upward movement of said arms across the ends of said container into supporting engagement with said upper shoulders, and outer extended positions wherein said lower shoulders are disposed for supporting engagement with said fork arms when said bin occupies said inverted position, means for yieldably urging said lower thrust shoulders to their extended positions, and means for effecting retraction of said lower thrust shoulders to their retracted positions against the action of said urging means.

3. A trash bin for use with a service vehicle of the type having a trash receiver and a fork lift device with spaced fork arms for elevating said bin from its normal upright position of use to an inverted position of elevation over said trash receiver to empty trash from said bin into said receiver, said trash bin comprising:

a lower rectangular container adapted to be straddled endwise by said fork arms and including a bottom wall bounded by upstanding side and end walls, upper thrust shoulders at the ends, respectively, of said container having downwardly presented shoulder surfaces disposed for supporting engagement with said fork lift arms when said trash bin occupies its normal upright position, lower thrust shoulders at the ends, respectively, of said container below said upper thrust shoulders and having upwardly presented shoulder surfaces, means supporting said lower thrust shoulders on said container for movement in generally endwise directions of said container between inner retracted positions wherein said lower shoulders are disposed to clear said fork arms for upward movement of said arms across the ends of said container into supporting engagement with said upper shoulders, and outer extended positions wherein said lower shoulders are disposed for supporting engagement with said fork arms when said bin occupies said inverted position, springs operatively connected between said container and said lower thrust shoulders for resiliently urging the latter shoulders to their extended positions, and said lower thrust shoulders having downwardly presented camming surfaces engageable by said fork arms for camming said lower shoulders to their retracted positions during upward movement of said fork arms across the ends of said container.

4. A trash bin for use with a service vehicle of the type having a trash receiver and a fork lift device with spaced fork arms for elevating said bin from its normal upright position of use to an inverted position of elevation over said trash receiver to empty trash from said bin into said receiver, said trash bin comprising:

a lower rectangular container adapted to be straddled endwise by said fork lift arms and including a bottom wall bounded by upstanding side and end walls, upper thrust shoulders mounted on said end walls, respectively, including downwardly presented thrust surfaces projecting beyond the outer surfaces of said end walls for supporting engagement with said fork lift arms when said bin occupies its normal upright position, lower thrust shoulders at the ends, respectively, of said container having upwardly presented thrust surfaces, means mounting said lower thrust shoulders on said end walls, respectively, for movement of said lower shoulders in generally endwise direction of said container and through openings in said end walls, respectively, between inner retracted positions wherein said lower shoulders are generally flush with the outer surfaces of said end walls to permit upward movement of said fork lift arms across the ends of said container into supporting engagement with said upper thrust shoulders, and outer extended positions wherein said lower thrust shoulders project beyond the outer surfaces of said end walls, respectively, for supporting engagement with said fork lift arms when said bin occupies said inverted position, spring acting between said container and said lower thrust shoulders for urging said lower shoulders to their extended positions, and said lower shoulders having downwardly presented camming surfaces engageable by said fork lift arms for camming said lower shoulders to their retracted positions during upward movement of said arms across the ends of said container into supporting engagement with said upper thrust shoulders.

5. A trash bin according to claim 4 wherein:
said lower thrust shoulders comprise generally flat, plate-like latch dogs disposed in planes respectively, generally parallel to said container side walls and pivotally mounted on said end walls for pivotal movement in their respective planes between their extended and retracted positions.

6. A trash bin for use with a service vehicle of the type having a trash receiver and a fork lift device with spaced fork arms for elevating said bin from its normal upright position of use to an inverted position of elevation over said trash receiver to empty trash from said bin into said receiver, said trash bin comprising:
a lower rectangular container adapted to be straddled endwise by said fork lift arms and including a bottom wall bounded by upstanding side and end walls, upper thrust shoulders mounted on said end walls, respectively, including downwardly presented thrust surfaces projecting beyond the outer surfaces of said end walls, respectively, for supporting engagement with said fork lift arms when said bin occupies its normal upright position, a pair of lower thrust shoulder assemblies mounted within each end of said container below said upper thrust shoulders and adjacent said container side walls, respectively, each shoulder assembly comprising a housing secured to an adjacent container wall, a generally flat, platelike latch dog disposed within said housing in a plane generally parallel to said container side walls and having an upwardly presented shoulder surface, means pivotally mounting said latch dog in said housing on an axis generally normal to said container side walls for pivotal movement through a slot in the adjacent container end wall between an inner retracted position and an outer extended position, a spring acting between said housing and latch dog for resiliently urging the latter to said extended position, and coacting stop means on said housing and said latch dog for limiting pivotal movement of said dog in the direction of said extended position thereof, the several latch dogs on said container when in their retracted positions being generally flush with the outer surfaces of said end walls, respectively, to permit upward movement of said fork lift arms across the ends of said container into supporting engagement with said upper thrust surfaces, said latch dogs in their extended positions projecting beyond the outer surfaces of said end walls, respectively, for supporting engagement with said fork lift arms when said bin occupies said inverted position, and said latch dogs having downwardly presented beveled camming surfaces engageable by said fork lift arms for retracting said latch dogs to their retracted positions against the action of said springs during upward movement of said fork lift arms across the ends of said container into supporting engagement with said upper thrust shoulders.

7. A thrust shoulder assembly for a trash bin of the character described comprising:
a housing having side and edge walls, a generally flat, bell crank shaped latch dog disposed within said housing in a plane substantially parallel to said housing side walls, means pivotally supporting said latch dog in said housing for pivotal movement on an axis normal to said side walls between a position of extension of one arm of said latch dog through an edgewall slot in said housing and a position of retraction of said latch dog arm into said housing, a spring within said housing acting between said housing and the other arm of said latch dog for urging said dog to its extended position, and laterally projecting stop shoulder means on said one arm of said latch dog engageable with the edge wall of said housing adjacent said slot for limiting extension of said dog under the action of said spring.

8. A thrust shoulder assembly according to claim 7 wherein:
said housing comprises a pair of generally channel shaped members each including a web section and a pair of flanges along two opposing edges of said web section, said channel members being arranged with said flanges on one member disposed in planes normal to the flanges on the other member and engaging the web section of the latter member between the adjacent ends, respectively, of the flanges on the latter member to position the web sections of said members in spaced generally parallel relation, whereby the flanges on one member form two opposing edge walls of said housing and the flanges on the other member form the remaining two opposing edge walls of said housing.

9. A trash bin for use with a trash collection vehicle having a trash receiver and means for elevating said bin from its normal upright position of use to an inverted position of elevation over said trash receiver to empty trash from said bin into said receiver, said trash bin comprising:
a lower container open at its top and including a bottom wall bounded by upstanding side and end walls, and a cover assembly overlying the top opening of said container including a hinge bar extending across the top opening generally parallel to and midway between said side walls and resting at its ends on the upper edges of said end walls, respectively, said bar dividing said top container opening into a pair of openings through which trash may be emptied into said bin in the normal upright position of said bin, a pair of covers hinged along their inner edges to opposite sides of said hinge bar for vertical swinging movement of said covers between closed positions wherein said covers close said latter openings, respectively, and open positions wherein said covers are disposed in upright confronting relation over said hinge bar to expose said latter openings, and releasable hinge means along the outer edge of one cover for releasably pivotally connecting said cover assembly to the adjacent container side wall to permit bodily swinging movement of the entire cover assembly to an open position relative to said container wherein the entire top opening of said container is exposed.

10. A trash bin according to claim 9 wherein:
said releasable hinge means comprise first hinge brackets secured to the outer edge of said one cover, second hinge brackets secured to the upper edge portion of said adjacent container side wall, said hinge brackets being disposed in overlapping relation when said one cover occupies said closed position thereof, and hinge pins removably insertable through said hinge brackets when the latter are disposed in said overlapping relation.

11. A trash bin according to claim 9 wherein:
the upper edges of said container end walls have notches seating the ends of said hinge bar for restraining said bar against lateral movement relative to said container.

12. A trash bin for use with a service vehicle of the type having a trash receiver and a fork lift device with spaced fork arms for elevating said bin from its normal upright position of use to an inverted position of elevation over said trash receiver to empty trash from said bin into said receiver, said trash bin comprising:

a rectangular container having a top opening and including a bottom wall bounded by upright side and end walls, upper thrust shoulders at the ends, respectively, of said container having downwardly presented shoulder surfaces disposed for supporting engagement with said fork lift arms when said trash bin occupies its normal upright position, lower thrust shoulders at the ends, respectively, of said container below said upper thrust shoulders and having upwardly presented shoulder surfaces, means supporting said lower thrust shoulders on said container for movement in generally endwise directions of said container between inner retracted positions wherein said lower shoulders are disposed to clear said fork arms for upward movement of said arms across the ends of said container into supporting engagement with said upper thrust shoulders, and outer extended positions wherein said lower shoulder surfaces on said lower thrust shoulders are disposed for supporting engagement with said fork lift arms when said bin occupies said inverted position, means for normally retaining said lower thrust shoulders in their extended positions, means for effecting retraction of said lower thrust shoulders to their retracted positions, and a cover assembly overlying said top opening of said container including a hinge bar extending across the top opening generally parallel to and midway between said side walls and resting at its ends on the upper edges of said end walls, respectively, said bar dividing said top container opening into a pair of openings through which trash may be empted into said bin in the normal upright position of said bin, a pair of covers hinged along their inner edges to opposite sides of said hinge bar for vertical swinging movement of said covers between closed positions wherein said covers close said latter openings, respectively, and open positions wherein said covers are disposed in upright confronting relation over said hinge bar to expose said latter openings, and hinge means along the outer edge of one cover for releasably pivotally connecting said cover assembly to the adjacent container side wall to permit bodily swinging movement of the entire cover assembly to an open position relative to said container wherein the entire top opening of said container is exposed.

13. A trash bin according to claim 12 wherein:
said lower thrust shoulders comprise generally flat latch dogs disposed in planes, respectively, generally parallel to said container side walls and pivotally mounted on said container end walls for pivotal movement between their extended and retracted positions through slots in said walls, respectively.

References Cited by the Examiner

UNITED STATES PATENTS

| | | | |
|---|---|---|---|
| 1,753,946 | 4/1930 | Replogle | 220—29 |
| 2,702,142 | 2/1955 | Jones | 220—29 X |
| 3,012,684 | 12/1961 | Sexton et al. | 214—302 |
| 3,136,437 | 6/1964 | Shimmon | 214—307 |

HUGO O. SCHULZ, *Primary Examiner.*